(12) United States Patent
Ukai (10) Patent No.: US 10,037,101 B2
(45) Date of Patent: Jul. 31, 2018

(54) TOUCH PANEL HAVING A FILTER UNIT FOR FILTERING UNINTENDED TOUCHES AND METHOD THEREOF

(71) Applicant: Rakuten, Inc., Tokyo (JP)

(72) Inventor: Hiroshi Ukai, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 27 days.

(21) Appl. No.: 14/904,432

(22) PCT Filed: Apr. 30, 2014

(86) PCT No.: PCT/JP2014/062029
§ 371 (c)(1),
(2) Date: Jan. 12, 2016

(87) PCT Pub. No.: WO2015/166568
PCT Pub. Date: Nov. 5, 2015

(65) Prior Publication Data
US 2016/0154518 A1 Jun. 2, 2016

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ..................................................... G06F 3/0416
USPC ........................................................ 345/173
See application file for complete search history.

(56) References Cited

U.S. PATENT DOCUMENTS

| 2002/0039092 | A1 | 4/2002 | Shigetaka |
| 2007/0109274 | A1* | 5/2007 | Reynolds ................ G06F 3/041 345/173 |
| 2009/0207145 | A1* | 8/2009 | Tsuzaki ................ G06F 3/0412 345/173 |
| 2011/0037727 | A1 | 2/2011 | Lee et al. |
| 2013/0328832 | A1* | 12/2013 | Boumgarten ......... G06F 3/0418 345/174 |

(Continued)

FOREIGN PATENT DOCUMENTS

| JP | 2002-082765 A | 3/2002 |
| JP | 2005-011233 A | 1/2005 |

(Continued)

OTHER PUBLICATIONS

English Translation of International Search Report for PCT/JP2014/062029 dated Jun. 17, 2014.

*Primary Examiner* — Long D Pham
(74) *Attorney, Agent, or Firm* — HEA Law PLLC (57) ABSTRACT

A position indicated by a user with a finger or a stylus can be detected even in a case where an edge of a hand on a little finger side, a wrist or the like touches a touch panel. An input device acquires a touch intensity change signal that indicates a change of touch intensity at a plurality of measuring positions on a touch panel, applies a frequency filter, which suppresses a frequency component of the touch intensity change signal generated by a touch other than by a finger or a stylus, to the touch intensity change signal at at least one of the measuring positions, and generates data of a position indicated by a user on the touch panel based on the touch intensity change signal, to which the frequency filter is applied, at the respective measuring positions.

7 Claims, 5 Drawing Sheets

(56) References Cited

U.S. PATENT DOCUMENTS

2014/0104225 A1* 4/2014 Davidson ............... G06F 3/044
                                                                        345/174

FOREIGN PATENT DOCUMENTS

| JP | 2013-210934 A | 10/2013 |
| JP | 2013-257904 A | 12/2013 |

\* cited by examiner

TOUCH PANEL HAVING A FILTER UNIT FOR FILTERING UNINTENDED TOUCHES AND METHOD THEREOF

CROSS REFERENCE TO RELATED APPLICATIONS

This application is a National Stage of International Application No. PCT/JP2014/062029 filed on Apr. 30, 2014. The contents of the above document is incorporated herein by reference in its entirety.

TECHNICAL FIELD

The present invention relates to an input device, an input method and a program.

BACKGROUND ART

Devices having a large touch panel, such as a tablet device, are becoming increasingly prevalent.

Patent Literature 1 discloses detecting whether a palm touches a capacitive type touch panel by using the maximum detected value at a detection point and detected values of previous and following detection points, and generating no coordinate data when the palm touches the panel.

CITATION LIST

Patent Document

Patent Literature 1: JP2002-082765A

SUMMARY OF INVENTION

Technical Problem

Touch panels having a large touch-sensitive area, such as a tablet device, are increasingly being used for inputting characters and graphics. When characters or graphics are input into a touch-sensitive area with a finger or a stylus, sometimes an edge of hand on a little finger side, a wrist or the like, comes in touch with the touch-sensitive area of the touch panel. If these parts come in touch with the touch-sensitive area of the touch panel, a position of the finger or the stylus indicated by the user cannot be detected.

Although touches by an edge of hand on a little finger side or a wrist may be distinguished from touches by a finger or a stylus based on a size of the touched area, those touches may not be distinguished in a case where, for example, only a part of a wrist touches the edge of the touch-sensitive area.

One or more embodiments of the present invention have been conceived in view of the above, and an object thereof is to provide an input device, an input method, and a program for detecting more reliably a position indicated by a user with a finger or a stylus even if an edge of hand on a little finger side or a wrist, for example, touches a touch-sensitive area of a touch panel.

Solution to Problem

In order to solve the above described problems, an input device according to the present invention includes touch intensity data acquiring means for acquiring a touch intensity change signal that indicates a change of touch intensity at a plurality of measuring positions on a touch panel, frequency filter means for applying a frequency filter, which suppresses a frequency component of the touch intensity change signal generated by a touch other than by a finger or a stylus, to the touch intensity change signal at at least one of the measuring positions, and indicated position data generating means for generating data of a position indicated by a user on the touch panel based on the touch intensity change signal, to which the frequency filter is applied, at the respective measuring positions.

An input method according to the present invention includes acquiring a touch intensity change signal that indicates a change of touch intensity at a plurality of measuring positions on a touch panel, applying a frequency filter, which suppresses a frequency component of the touch intensity change signal generated by a touch other than by a finger or a stylus, to the touch intensity change signal at at least one of the measuring positions, and generating data of a position indicated by a user on the touch panel based on the touch intensity change signal, to which the frequency filter is applied, at the respective measuring positions.

A program according to the present invention for causing a computer to execute processing of acquiring a touch intensity change signal that indicates a change of touch intensity at a plurality of measuring positions on a touch panel, applying a frequency filter, which suppresses a frequency component of the touch intensity change signal generated by a touch other than by a finger or a stylus, to the touch intensity change signal at at least one of the measuring positions, and generating data of a position indicated by a user on the touch panel based on the touch intensity change signal, to which the frequency filter is applied, at the respective measuring positions.

According to the present invention, it is possible to reliably detect a position indicated by a user with a finger or a stylus even if an edge of a hand on a little finger side, a wrist or the like, touches a touch-sensitive area of a touch panel.

In an embodiment of the present invention, the frequency filter may suppress a component equal to or lower than a predetermined frequency.

In an embodiment of the present invention, the frequency filter may suppress the frequency component of the touch intensity change signal generated by the touch other than by the finger or the stylus at the respective measuring positions based on a current touch intensity and a touch intensity at a predetermined time period before a current time, the predetermined time being longer than a touch time by the finger or the stylus on the respective measuring positions.

In an embodiment of the present invention, the indicated position data generating means may not output the data of the position indicated by the user on the touch panel during a predetermined exclusion period after a first touch on the touch panel is made.

DESCRIPTION OF EMBODIMENTS

An embodiment of the present invention will be described below in detail with reference to the accompanying drawings. The elements having the same functions are designated with the same symbols, and their overlapping explanation will be omitted.

Figure 1:
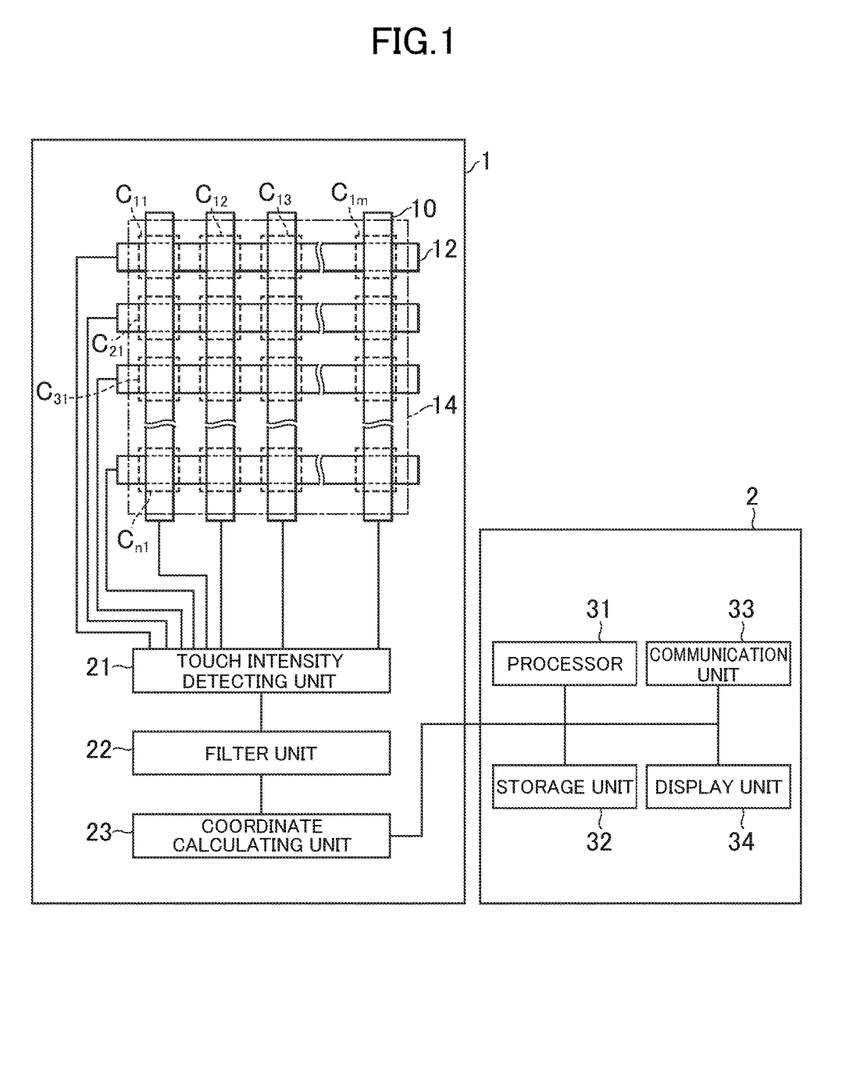
FIG. 1 is a diagram illustrating an example of a configuration of a touch panel input device according to an embodiment of the present invention.

FIG. 1 is a diagram illustrating an example of configuration of a touch panel input device according to an embodiment of the present invention. The touch panel input device includes a touch panel 1, which is a capacitive type touch panel, and a host 2. The touch panel 1 includes scanning electrodes 10 disposed longitudinally, detection electrodes 12 disposed laterally, a touch intensity detecting unit 21 that detects signals indicating touch intensity of measuring portions C disposed where the scanning electrodes 10 and the detection electrodes 12 intersect, a filter unit 22, and a coordinate calculating unit 23. The touch panel 1 is a capacitive type touch panel. The host 2 includes a processor 31, a storage unit 32, a communication unit 33, and a display unit 34. Specifically, the touch panel input device is a tablet device or an electronic book reader, for example.

The scanning electrodes 10 respectively extend in a horizontal direction of FIG. 1, and ends of the scanning electrodes 10 are connected to the touch intensity detecting unit 21 by wiring. The detection electrodes 12 respectively extend in a vertical direction of FIG. 1, and each end of the detection electrodes is connected to the touch intensity detecting unit 21 by wiring. The measuring portions C are respectively disposed at the positions where the scanning electrodes 10 and the detection electrodes 12 intersect. The touch intensity is a degree of proximity or contact. The measuring portions C are m×n matrix. In FIG. 1 a measuring portion C at ith row and jth column is described as Cij. The measuring portions C are disposed within the touch-sensitive area 14 of the touch panel. In the following, a position of each measuring portion Cij is described as measuring position Pij.

The touch intensity detecting unit 21 includes a scanning circuit that repeatedly provides the scanning electrodes 10 with pulse signals in sequence for each frame period, and a signal acquiring circuit that acquires a signal having touch intensity according to changes in mutual capacitance when the pulse is provided, and makes AD conversion of the acquired signal of the touch intensity into a data signal. When the scanning circuit applies a pulse to one of the scanning electrodes 10, the signal acquiring circuit outputs a data signal indicating touch intensity of the measuring portions C disposed where such scanning electrode 10 intersects with the detection electrodes 12. When the scanning circuit finishes scanning once each of all of the scanning electrodes 10, the signal acquiring circuit outputs data signals indicating touch intensity at respective measuring portions C in the frame period. Here, one frame period corresponds to a sampling period of touch intensity. The touch intensity detecting unit 21 acquires scanning and data signals for multiple frame periods, and thereby outputting data signals indicating a temporal change of touch intensity at the measuring positions P corresponding to the measuring portions C. The data signals that are output for the frame periods indicate the change of touch intensity at each of the measuring positions P.

Figure 2:
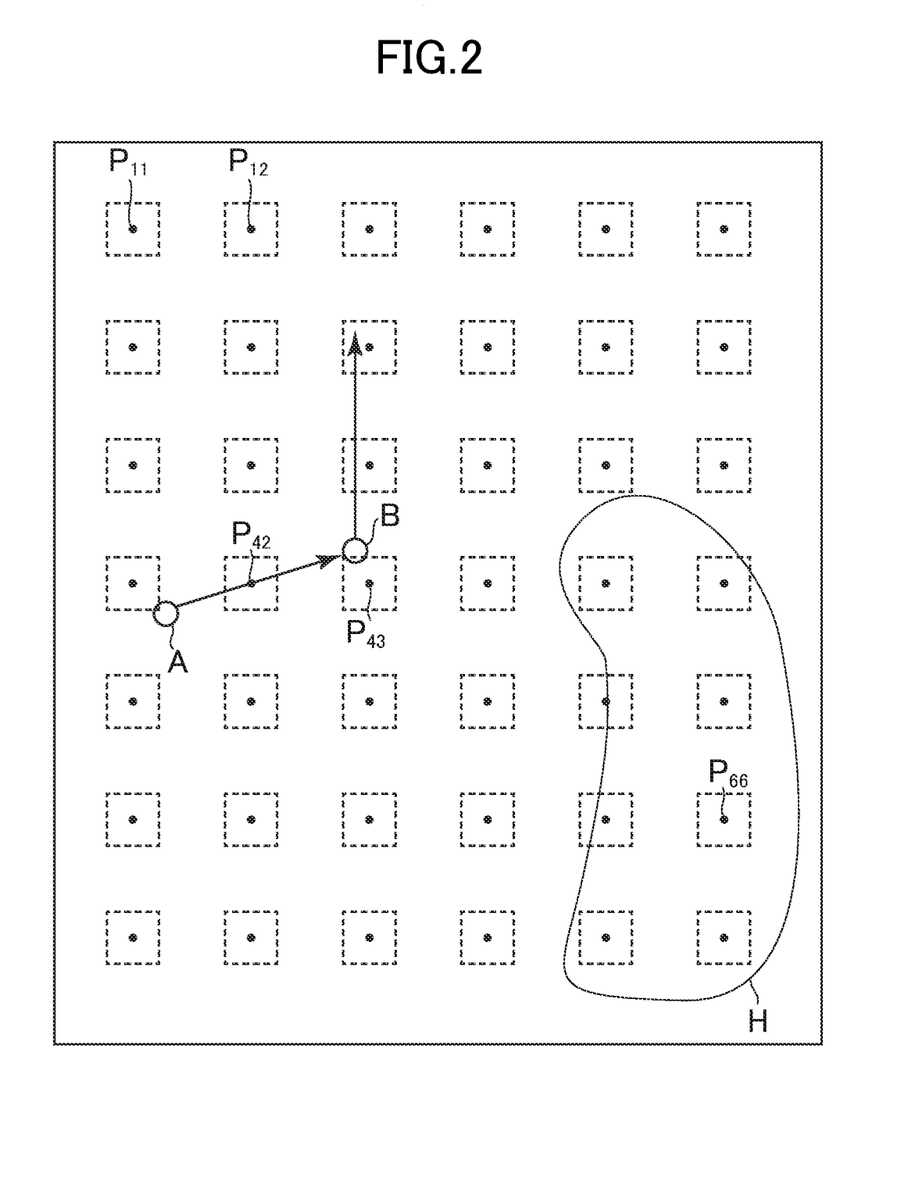
FIG. 2 is a diagram illustrating an example of a touch-sensitive area of a touch panel, measuring positions in the touch-sensitive area, and positions of a finger and a side of a hand to touch the touch-sensitive area.

FIG. 2 illustrates an example of the touch-sensitive area of the touch panel, the measuring positions P in the touch-sensitive area 14, and positions of a finger and a side of a hand each touching the touch-sensitive area 14. The measuring positions P are arranged in a matrix on the touch-sensitive area 14 of the touch panel. The position A in FIG. 2 is a position touching the stylus at time t1, and the position B is a position touching the stylus at time t2, at which a certain time passes from time t1. The touching area H in FIG. 2 indicates an area of the edge of the hand on the little finger side touching the touch-sensitive area 14 of the touch panel.

Figure 3:
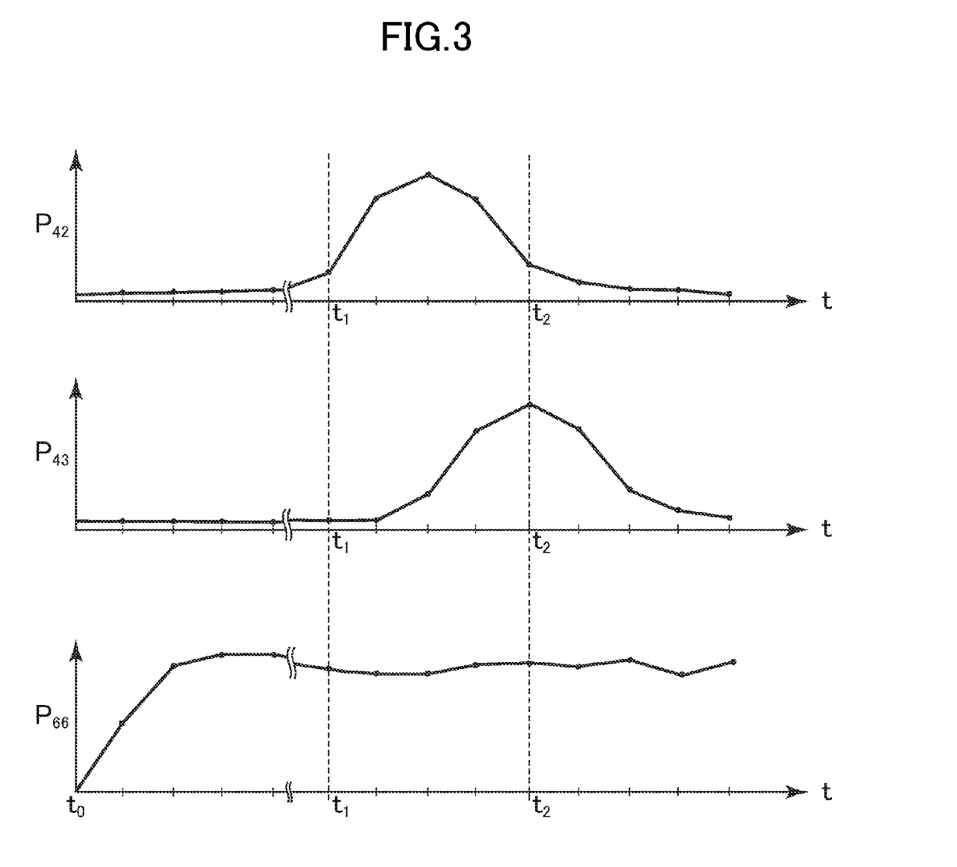
FIG. 3 is a diagram illustrating an example of a temporal change of values of touch intensity in data signals at three measuring positions.

FIG. 3 illustrates an example of a temporal change of values of touch intensity at three measuring positions P42, P43, and P66 among the measuring positions P shown in FIG. 2. In each of three graphs in FIG. 3, a horizontal axis shows time, and a vertical axis shows touch intensity. FIG. 3 shows a graph in a case where a sampling cycle is 1/20 second. On a capacitive type touch panel, touch intensity of a finger or a stylus is measured when the finger or the stylus is close to the touch panel to a certain degree, even if the finger or the stylus does not touch the measuring positions P. As such, even if the stylus is at the position A, a value of the touch intensity of the stylus at the measuring position P42 is detected. As the stylus is moving to the position B, the value of the detected touch intensity is changed to become the maximum value at the measuring position P42, and then is reduced again.

At the measuring position P43, the value of touch intensity is hardly affected by the stylus at time t1, and reaches the maximum value at time t2. At the measuring position P66, touch intensity begins to increase from time t0, at which the edge of the hand on the little finger side touches the touch panel, and from time t1 to time t2, touch intensity remains at higher values. This is because the edge of the hand on the little finger side touches the touch panel at almost the same position while the stylus is moving. When operating a touch panel, a user usually hardly moves the edge of the hand on the little finger side or the wrist to move the stylus or the finger. Here, assume a case where the touching area H is touched by the edge of the hand on the little finger side, although a case where a wrist or a palm on the wrist side touches the area would show the same result as shown in FIG. 3. Further, a case where not a stylus but a finger touches the positions A and B would also show the same temporal change of the touch intensity indicated in FIG. 3.

The filter unit 22 applies a frequency filter to data signals indicating a temporal change of touch intensity at each measuring position P. The frequency filter suppresses frequency components of the data signal generated by a touch by a part of the user's body other than a finger or a stylus. The frequency filter is a filter, such as a high-pass filter, for suppressing a component equal to or less than a frequency lower than a frequency mainly corresponding to a touch other than by a finger or a stylus among input signals, and outputs the suppressed signal.

The filter unit 22 has the same number of high-pass filters as the measuring portions C, and the high-pass filters and the measuring portions C correspond to each other one by one. To each of the high-pass filters, a data signal indicating a temporal change of the touch intensity measured for corresponding measuring portion C is input. The high-pass filters outputs a data signal (described as "filtered data signal" in the following) indicating a temporal change of the touch intensity to which such filter is applied.

Figure 4:
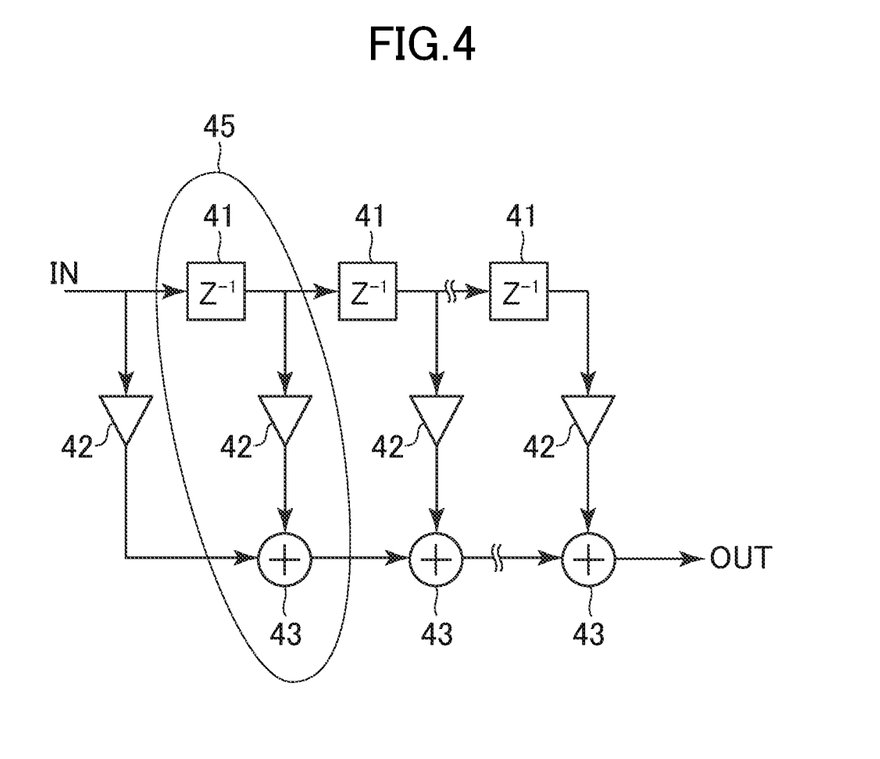
FIG. 4 is a diagram illustrating an example of a high-pass filter included in a filter unit.

FIG. 4 illustrates an example of a high-pass filter included in the filter unit 22. In this embodiment, the high-pass filter is a digital filter, and the digital filter shown in FIG. 4 is referred to as a FIR filter. For each frame period, a value of touch intensity, indicated by a data signal, measured at a measuring portion C corresponding to the high-pass filter is input into the signal input IN of the high-pass filter. As a frame period passes, the high-pass filter outputs a value of touch intensity, which is generated by applying the high-pass filter to the data signal, to the signal output OUT in such frame period. The high-pass filter may suppress components so that a degree of suppression gradually increases from a lower frequency to a higher frequency than a reference frequency, or may suppress components so that all of the components equal to or less than the reference frequency are smaller than a noise signal (e.g., 0).

The high-pass filter includes a plurality of stages of taps 45, and each tap 45 includes a delay block 41, a multiplier 42, and an adder 43. A delay block 41 is a memory (storage unit) that keeps (stores) a value of touch intensity during a frame period, and, when the frame period has passed, outputs the value to a delay block 41 and a multiplier 42 included in a tap 45 at the next stage. A multiplier 42 belonging to a tap 45 multiplies a value from the delay block 41 by a predetermined constant value, and outputs the value to the adder 43. Here, the high-pass filter includes a multiplier 42 that does not belong to a tap 45. Such multiplier 42 multiplies a value fed into the signal input IN by a constant value, and outputs the multiplied value to an adder 43 included in a tap 45 at the first stage. Each of the adders 43 included in taps 45 at the stages other than the first stage adds an output value of an adder 43 belonging to a tap 45 at a previous stage to the value from the multiplier 42, and outputs the added value to an adder 43 included in a tap 45 at a next stage. The adder 43 included in the tap 45 at the first stage adds an output from a multiplier 42 at the same stage to an output from the multiplier 42 that does not belong to a tap 45, instead of an output from the multiplier 42 included in the tap 45 at the previous stage, and outputs the added value to a tap 45 at the second stage.

The number of taps 45 included in the high-pass filter and the constant to be multiplied by the multipliers 42 are determined so that frequency components lower than the frequency of the predetermined threshold value are suppressed. The high-pass filter suppresses frequency components of touch intensity generated by a contact with an edge of a hand on a little finger side, a wrist or the like using at least (a value of) the current touch intensity and (a value of) the touch intensity of the predetermined previous time from the current time. The predetermined previous time needs to be longer than a period of time in which a value of touch intensity, which is not noise and is generated by a touch by a finger or a stylus, is detected for each measuring position P (touch time). Further, regarding a touch panel used in a tablet device, for example, a period of time in which a finger or a stylus approaches and moves away from an electrode is considered to be about 0.2 to 0.3 seconds. As such, the number of taps 45 is determined so that a value of touch intensity corresponding to a period of time twice that of such period of time, e.g., 0.5 to 0.6 seconds, is at least stored in the memory of the delay block 41. Preferably, the high-pass filter shown in FIG. 4 includes the number of stages twice the number 10, which is the number (sampling number) of the frame periods in such period of time. A digital high-pass filter different from the high-pass filter shown in FIG. 3 also needs to include a storage unit for storing a value of touch intensity that is sampled for a period of time twice longer than the period of time in which a finger or a stylus approaches and moves away from an electrode.

Figure 5:
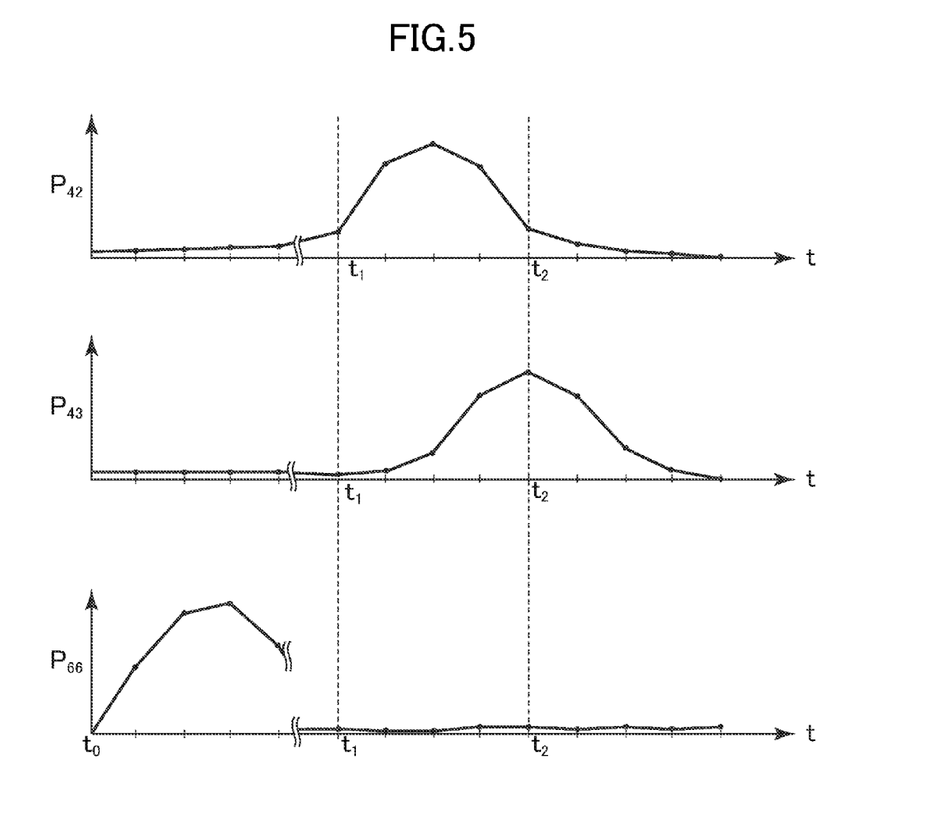
FIG. 5 is a diagram illustrating an example of a temporal change of values of touch intensity in filtered data signals at three measuring positions.

FIG. 5 illustrates an example indicating a temporal change of values of touch intensity indicated by the filtered data signals at three measuring positions P42, P43, and P66 among the plurality of measuring positions P shown in FIG. 2. The filtered data signals at the measuring positions P42 and P43 are scarcely suppressed, when compared to the data signal that has not been filtered. The high-pass filters generate the filtered data signals corresponding to inputting characters and graphics with a stylus or a finger. On the other hand, the filtered data signals at the measuring position P66 touched by the edge of the hand on the little finger side is suppressed especially after time t1. The filtered data signals are similar to the data signals that have not been filtered in a case where an edge of a hand on little finger side, a wrist or the like does not touch the touch panel. This enables the filter unit 22 to reduce the impact of touches by the edge of the hand on the little finger side, the wrist or the like. In this regard, during a predetermined period of time after the edge of the hand on the little finger side begins to contact the measuring position P66 at time t0, the unit 22 cannot filter a value of touch intensity, and a value of touch intensity indicating a touch will be output. A method to address this phenomenon will be discussed below.

The coordinate calculating unit 23 generates data of a position indicated by the user on the touch-sensitive area 14 of the touch panel 1 based on the filtered data signal. For example, the coordinate calculating unit 23 obtains a position of the center of gravity of filtered values of touch intensity, at each measuring position P output by the filter unit 22 in a frame period, as a position indicated by the user in such frame period. Subsequently, the coordinate calculating unit 23 outputs the indicated position to the processor 31, for example, included in the host 2. The method for obtaining the position of the center of gravity as the position indicated by the user is generally used for calculating coordinates of a touch panel. The coordinate calculating unit 23 may obtain the indicated position using other methods for calculating coordinates of the indicated position based on the filtered data signals.

Here, the coordinate calculating unit 23 may not output data of the position indicated by the user on the touch panel during a predetermined exclusion period after the touch-sensitive area of the touch panel 1 is first touched by the user. Specifically, when the signal, which indicates that the user has not touched anywhere on the touch-sensitive area in the previous frame period (such signal may be a filtered data signal), is output, and the signal, which indicates that any of the measuring positions P is touched in the current frame period (such signal may be a filtered data signal), is output, the coordinate calculating unit 23 does not output data indicating a position indicated by the user to the host 2 during the exclusion period after that time. In this way, in a case where the filtering by the filter unit 22 in FIG. 5 is not sufficient when the edge of the hand on the little finger side, the wrist or the like touches the touch-sensitive area, it is possible to prevent coordinates of positions, which are not indicated by the user, from being used in the processing of the host 2. This exclusion period may be determined according to characteristics of the filter unit 22. For example, the exclusion period may be set longer than a period, in which the filter unit 22 outputs a value of touch intensity indicating a touch is made, immediately after the edge of the hand on the little finger side, the wrist or the like touches the touch-sensitive area. For example, when the filter unit 22 suppresses a frequency component in a period of time of 0.5 seconds, an exclusion period may be set for 0.5 seconds or longer.

The frequency filter may not necessarily be a high-pass filter. The frequency filter may be a filter having frequency characteristics such that components equal to or lower than a certain frequency are suppressed among the touch intensity change signals indicating touch intensity at respective measuring positions P. The components of the frequency to be suppressed are hardly included in the measuring portions C when characters or graphics are input with a stylus or a finger, and are mainly included in the measuring portions C when the edge of the hand on the little finger side or the wrist touches the touch-sensitive area 14.

When a program stored in the storage unit 32 is executed, the processor 31, the storage unit 32, the communication unit 33, and the display unit 34, each included in the host 2, are implemented to output an image to a display output device of the display unit 34, for example, in response to the position input by the user from the touch panel 1. In the following, the host 2 will be briefly explained.

The processor 31 executes a program stored in the storage unit 32, and the communication unit 33 controls the display unit 34. The program may be provided via the Internet or by being stored in a computer-readable storage medium such as a flash memory.

The storage unit 32 includes a memory device such as a RAM or a flash memory, and a hard disk drive. The storage unit 32 stores the program. In addition, the storage unit 32 stores information and computational result input from each unit.

The communication unit 33 implements functions to communicate with other devices, and includes an integrated circuit constituting a wireless LAN and an antenna, for example. The communication unit 33 inputs information received from other devices into the processor 31 and the storage unit 32, and sends information to other devices under the control of the processor 31.

The display unit 34 includes a display output device and a video controller that controls the display output device. The display unit 34 outputs display data to the display output device under the control of the processor 31. The display output device may be connected outside of the touch panel input device.

Although the embodiment of the present invention has been described as above, other methods may also be applied. For example, in the discussion above, the filter unit 22 and the coordinate calculating unit 23 are implemented by hardware such as an integrated circuit, although functions of the filter unit 22 and the coordinate calculating unit 23 may be implemented by the processor 31's execution of a program stored in the storage unit 32. For example, the processor 31 executing the program may obtain a value of touch intensity indicated by a data signal from the touch intensity detecting unit 21, process the value, and stores the value of the position indicated by the user in the storage unit 32, so that the processing of the filter unit 22 and the coordinate calculating unit 23 is executed. The program may be provided through the Internet, for example, or by being stored in a computer-readable storage medium, such as a flash memory.

The present invention may be applied to other devices than a tablet-type device or an electronic book reader. For example, the touch panel input device may be an external touch panel that is connected to a personal computer, for example, or a touch panel provided as a component without including the host 2.

The invention claimed is:

1. An input device comprising:
a scanning circuit and a signal acquiring circuit acquiring a touch intensity change signal that indicates a change in touch intensity at a plurality of measuring positions on a capacitive type touch panel in which the touch intensity is a degree of proximity or contact;
an integrated circuit including a frequency filter which suppresses a frequency component of the touch intensity change signal at at least one of the measuring positions which is generated by a touch other than by a finger or a stylus; and
generating coordinates of a position indicated by a user on the touch panel, said coordinates calculated by using the touch intensity change signal, to which the frequency filter is applied, at the respective measuring positions,
wherein the integrated circuit generates coordinates of a position indicated by a user's finger or stylus which is in contact with the touch panel and which moves thereon by using the touch intensity change signal as an input, to which the frequency filter is applied, at the respective measuring positions; and
wherein the frequency filter is a high-pass filter and suppresses the frequency component of the touch intensity change signal generated by the touch other than by the finger or the stylus at the respective measuring positions based on a current touch intensity and a touch intensity at a predetermined time period before a current time, the predetermined time being longer than a touch time by the finger or the stylus on the respective measuring positions.

2. The input device according to claim 1, wherein the frequency filter suppresses a component equal to or lower than a predetermined frequency.

3. The input device according to claim 1, wherein the indicated position data generating means does not output the coordinates of the position indicated by the user on the touch panel during a predetermined exclusion period after a first touch on the touch panel is made.

4. The input device according to claim 1, wherein the indicated position data generating means generates coordinates of a position indicated by a user on the touch panel by applying a predetermined expression to the touch intensity change signal, to which the frequency filter is applied, at the respective measuring positions.

5. The input device according to claim 1, wherein the indicated position data generating means generates coordinates of a position indicated by a user's finger or stylus which is in contact with the touch panel and which moves thereon by using the touch intensity change signal as an input, to which the frequency filter is applied, at the respective measuring positions.

6. An input method comprising:
acquiring a touch intensity change signal that indicates a change of touch intensity at a plurality of measuring positions on a capacitive type touch panel in which the touch intensity is a degree of proximity or contact;
applying a high-pass frequency filter, which suppresses a frequency component of the touch intensity change signal at at least one of the measuring positions which is generated by a touch other than by a finger or a stylus; and
generating coordinates of a position indicated by a user's finger or stylus which is in contact with the touch panel and which moves thereon by using the touch intensity change signal as an input, to which the frequency filter is applied, at the respective measuring positions; and wherein the high-pass frequency filter suppresses the frequency component of the touch intensity change signal based on a current touch intensity and a touch intensity at a predetermined time period before a current time, the predetermined time being longer than a touch time by a finger or a stylus on the respective measuring positions.

7. A non-transitory computer readable storage medium storing a program for causing a computer to:

acquire a touch intensity change signal that indicates a change of touch intensity at a plurality of measuring positions on a capacitive type touch panel in which the touch intensity is a degree of proximity or contact;

suppress a frequency component of the touch intensity change signal at at least one of the measuring position which is generated by a touch other than by a finger or a stylus using a high pass frequency filter; and generate coordinates of a position indicated by a user on the touch panel using the touch intensity change signal as an input, to which the frequency filter is applied, at the respective measuring positions wherein the computer generates coordinates of a position indicated by a user's finger or stylus which is in contact with the touch panel and which moves thereon by using the touch intensity change signal as an input, to which a frequency filter is applied, at the respective measuring positions; and wherein the high-pass frequency filter suppresses the frequency component of the touch intensity change signal based on a current touch intensity and a touch intensity at a predetermined time period before a current time, the predetermined time being longer than a touch time by a finger or a stylus on the respective measuring positions.

* * * * *